US008644347B2

(12) United States Patent
Loprieno et al.

(10) Patent No.: US 8,644,347 B2
(45) Date of Patent: Feb. 4, 2014

(54) TRANSPORTING OPTICAL DATA UNITS IN AN OPTICAL TRANSPORT NETWORK

(75) Inventors: Gilberto Loprieno, Milan (IT); Luca Della Chiesa, Concorezzo (IT)

(73) Assignee: Cisco Technology, Inc., San Jose, CA (US)

( * ) Notice: Subject to any disclaimer, the term of this patent is extended or adjusted under 35 U.S.C. 154(b) by 632 days.

(21) Appl. No.: 12/685,036

(22) Filed: Jan. 11, 2010

(65) Prior Publication Data

US 2011/0170866 A1    Jul. 14, 2011

(51) Int. Cl.
*H04J 3/06* (2006.01)

(52) U.S. Cl.
USPC .......................................... 370/503

(58) Field of Classification Search
USPC .................. 370/503, 473, 474, 475
See application file for complete search history.

(56) References Cited

U.S. PATENT DOCUMENTS

| 7,385,995 | B2 * | 6/2008 | Stiscia et al. ................. | 370/412 |
| 7,742,502 | B2 * | 6/2010 | Vissers et al. ................ | 370/473 |
| 2003/0048813 | A1 * | 3/2003 | Lahav et al. ................. | 370/537 |
| 2003/0152079 | A1 * | 8/2003 | Loeffler et al. .............. | 370/392 |
| 2006/0104309 | A1 | 5/2006 | Vissers et al. | |

OTHER PUBLICATIONS

International Telecommunication Union, ITU-T, Telecommunication Standardization Sector of ITU, G.709/Y.1331, Corrigendum 1, Series G: Transmission Systems and Media, Digital Systems and Networks, Series Y: Global Information Infrastructure, Internet Protocol Aspects and Next-Generation Networks, 10 pages, Dec. 2006.
"Ethernet over SDH", Wikipedia, the free encyclopedia, http://en.wikipedia.org/wiki/Ethernet over SDH, 2 pages, Printed Jan. 8, 2010.

* cited by examiner

*Primary Examiner* — Mark Rinehart
*Assistant Examiner* — Mohammad Anwar
(74) *Attorney, Agent, or Firm* — Baker Botts L.L.P.

(57) ABSTRACT

According to one embodiment, transporting Optical Data Units in an Optical Transport Network comprises receiving a first frame of a first type that includes second frames of a second type. Each second frame is associated with a signal having a client clock rate, and at least two second frames are associated with at least two signals with different client clock rates. The following is repeated for each second frame: determining a client clock rate of the signal associated with the second frame; and inserting clock justification information into the second frame. The clock justification information indicates how to justify the client clock rate of the second frame to synchronize the client clock rate with a system reference clock rate.

23 Claims, 2 Drawing Sheets

TRANSPORTING OPTICAL DATA UNITS IN AN OPTICAL TRANSPORT NETWORK

TECHNICAL FIELD

The present disclosure relates generally to communication systems.

BACKGROUND

Client devices may send client signals with different client clock rates. Client signals may be communicated to systems that utilize a system clock rate that differs from the client clock rates. Managing the different clock rates may be complicated.

DESCRIPTION OF EXAMPLE EMBODIMENTS

Overview

According to one embodiment, transporting Optical Data Units in an Optical Transport Network comprises receiving a first frame of a first type that includes second frames of a second type. Each second frame is associated with a signal having a client clock rate, and at least two second frames are associated with at least two signals with different client clock rates. The following is repeated for each second frame: determining a client clock rate of the signal associated with the second frame; and inserting clock justification information into the second frame. The clock justification information indicates how to justify the client clock rate of the second frame to synchronize the client clock rate with a system reference clock rate. In on embodiment, the second frames are transmitted to a device configured to generate a third frame from the second frames. In certain embodiments, justification bytes may be added to the second frame to preserve some or all overhead bytes and payload bytes of the second frame if there is a change in the clock domain, for example, when a positive or negative justification is requested.

Description

Figure 1:
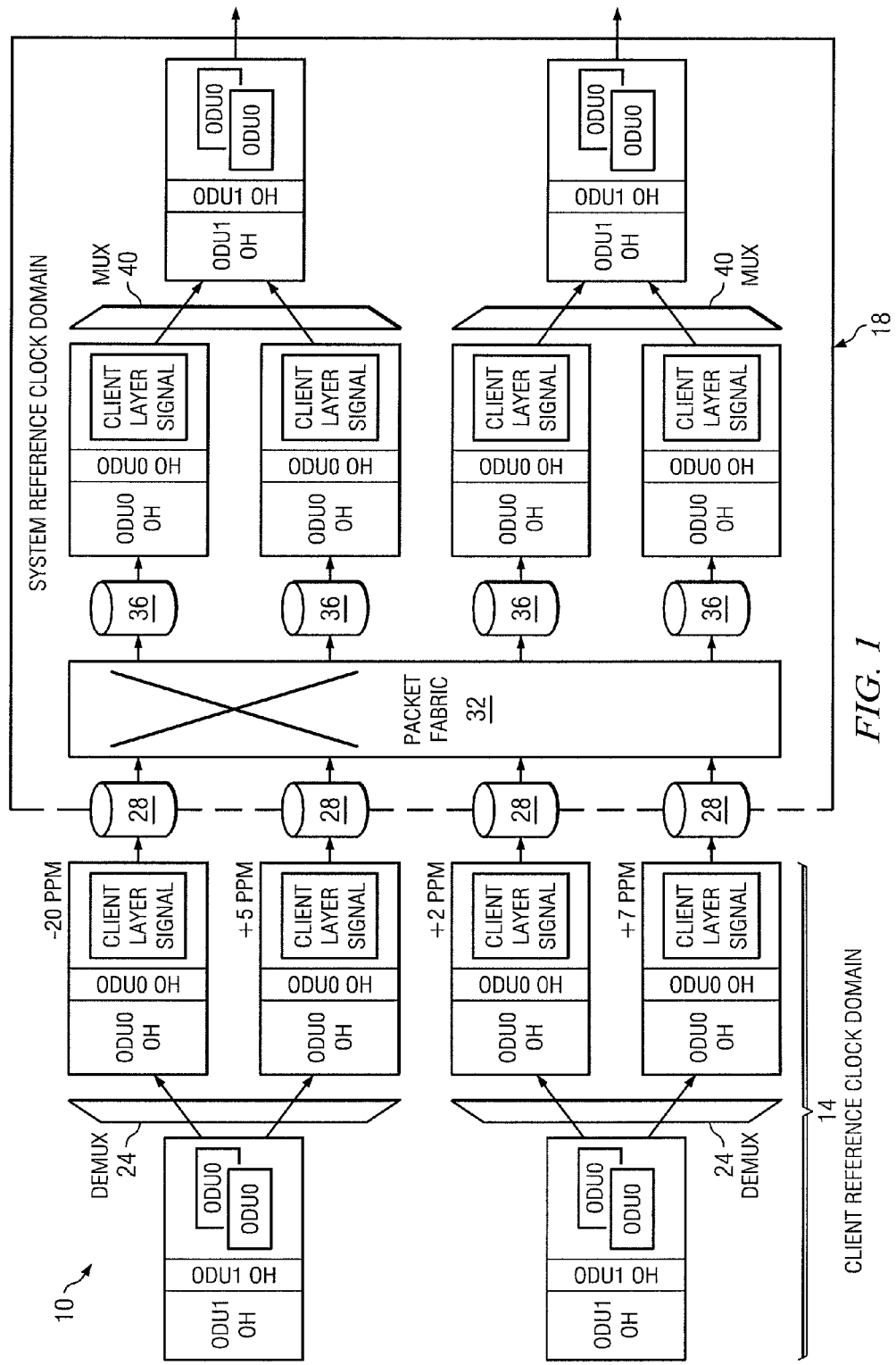
FIG. 1 illustrates an embodiment of a system for transporting Optical Data Units.

FIG. 1 illustrates an embodiment of a system 10 for transporting Optical Data Units-k (ODUks). System 10 may transport an ODU1 that includes ODU0s with signals of different client clock rates. System 10 may insert clock justification information into the ODU0s that allows a device (such as a switch) with a system clock rate to accommodate the different client clock rates.

In certain embodiments, system 10 may operate in an Optical Transport Network (OTN) that communicates ODUs that carry Gigabit Ethernet (GbE) signals. In particular embodiments, the ODUs may be implemented according to an OTN hierarchy described in ITU-T Recommendation G.709, which is incorporated herein by reference. The OTN hierarchy includes levels, which are represented in this document as OXUs. For example, a client signal may be mapped into an Optical Channel Payload Unit (OPU), the OPU may be mapped into an Optical Channel Data Unit (ODU), and the ODU may be mapped into an Optical Channel Transport Unit (OTU). An OXU into which another OXU is mapped may be regarded as a container of the other OXU.

In the hierarchy, there may be Optical Channel Payload Units-k (OPUks), Optical Channel Data Units-k (ODUks), and Optical Channel Transport Units-k (OTUks) for different frequencies k. For example, OPU1, ODU1, and OTU1 (k=1) are related to a line rate of approximately 2.5 Gbps (for example, Synchronous Transport Module (STM) 16). OPU2, ODU2, and OTU2 (k=2) are related to a line rate of approximately 10 Gbps (for example, STM 64). OPU3, ODU3, and OTU3 (k=3) are related to a line rate of approximately 40 Gbps (for example STM 256).

In certain cases, a GbE signal is mapped to an ODU using the Transparent Generic Framing Protocol (GFP-T). ODUs facilitate connectivity at the sub-wavelength level. For example, a 10 Gbps optical wavelength may carry four ODU1 each at 2.5 Gbps. An ODU0 is half the size of ODU1 and can carry a GbE stream transparently. In certain examples, one ODU0 can carry a single GBE stream transparently.

In the embodiment, system 10 includes a client reference clock domain 14 and a system reference clock domain 18. Client reference clock domain 14 includes one or more clients and demultiplexers (demuxes) 24. One or more buffers 28 may be located at the interface of domains 14 and 18. System reference clock domain 18 includes one or more packet fabrics 36, buffers 36, and multiplexers (muxes) 40.

In certain embodiments, client reference clock domain 14 includes clients that each send ODU0s with signals at client clock rates, and at least two clients may utilize different client clock rates. Accordingly, an ODU0 is associated with a signal having a client clock rate, and different ODU0s may be associated with signals with different client clock rates.

The ODU0s are then carried in ODU1s (i.e., a first type of frame carries a second type of frame). An ODU0 transports complete client signals transparently, that is, untouched by OTN, without rewriting the header of the packets in the data flow. Furthermore, a client signal is transported at its own clock rate and phase such that the complete network need not be synchronized to a common clock. That is, the ODU0s preserve client clock rates.

Demux 24 may be any suitable device configured to demux an ODU1 into ODU0s. In certain embodiments, demux 24 may receive an ODU1. Demux 24 may repeat the following for each ODU0: determine a client clock rate of a signal associated with an ODU0, and insert a clock justification information into the ODU0. The clock justification information indicates how to justify the client clock rate of the ODU0 to synchronize the client clock rate with a system reference clock rate of packet fabric 32 or other suitable device. Demux 24 may then transmit the ODU0s to buffers 28 of system reference clock domain, which operates according to a system reference clock.

In certain embodiments, buffers 28 send the ODU0s to packet fabric 32. Packet fabric 32 may comprise any suitable device configured to switch ODU0s. In the embodiments, packet fabric 32 uses the justification information to synchronize the clock rates.

In certain embodiments, packet fabric 32 sends the ODU0s to muxes 40. Mux 40 may be any suitable device configured to mux ODU0s to yield an ODU1. Mux 40 then communicates the ODU1.

Figure 2:
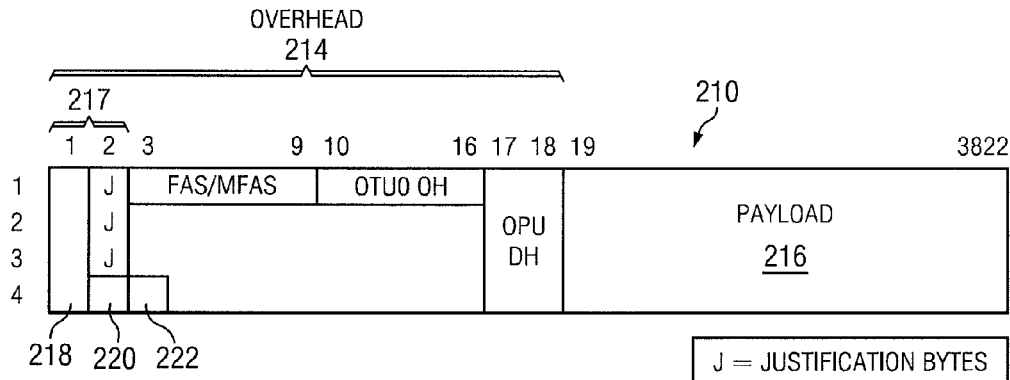
FIG. 2 illustrates an example of an ODU0 that includes clock justification information.

FIG. 2 illustrates an example of an ODU0 210 that includes clock justification information. The clock justification information may be included in any suitable portion of ODU0, such as the payload and/or header. In certain embodiments, the justification information may be applied before operation and maintenance bytes, which may preserve the overhead and payload.

In the illustrated example, ODU0 210 includes payload 216, alignment bytes 218, and an ODU0-S envelope 217. ODU0-S envelope 217 communicates clock justification information, which may include justification bytes J, negative justification opportunity (NJO) bytes 220, and positive justification opportunity (PJO) payload bytes 222. In certain embodiments, NJO bytes may be overhead bytes that may be used to transport a client data byte, and PJO bytes 222 may be payload bytes that may be forced as Fixed Stuffing (FS) bytes. Fixed Stuffing (FS) bytes are not used to transport payload and provide bandwidth for additional aggregation. Justification bytes J may indicate whether an overhead byte is transporting payload or a payload byte is not transporting payload.

In certain embodiments, the clock justification information increases or decreases the size of the ODU0 frame. For example, a frame may transport B bytes. If the client signal has a higher frequency that the frequency of the frame, negative justification may be used to carry more bytes. For example, B+1 bytes may be transported by inserting payload bytes into NJO bytes 220. Justification bytes J may indicate whether an overhead byte is transporting payload. If the client signal has a lower frequency that the frequency of the frame, positive justification may be used to carry fewer bytes. For example, B−1 bytes may be transported by inserting stuffing into PJO bytes 222. Justification bytes J may indicate whether a payload byte is not transporting payload.

In certain embodiments, the positive/negative (P/N) information comprises a plurality of replicated positive/negative indicators. The replicated positive/negative indicators may be repeated any suitable number of times, such as three, four, or five times. The direction with the most number of indicators may be selected as the direction to use. For example, if there are two positive indicators and one negative indicator, the positive direction may be selected.

In certain embodiments, the clock justification information comprises a value indicating the amount of the justification, such as the number of bytes of the justification. As with the positive/negative indicators, the value indicators may be repeated any suitable number of times, and the value with the most number of indicators may be selected as the value to use.

In certain embodiments, a header error check (HEC) calculated from a cyclic redundancy check over the clock justification information may be inserted into an ODU0 to allow for detection of errors and correction of single bit error.

Figure 3:
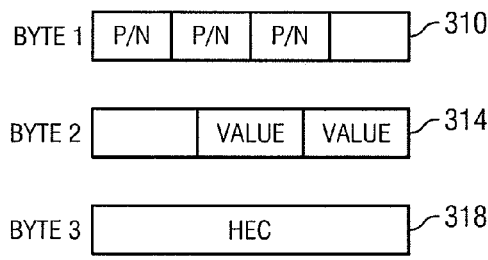
FIG. 3 illustrates an example format of justification information.

FIG. 3 illustrates an example format of justification information. The justification information may have any suitable format. In the illustrated example, byte 1 includes P/N information 310, byte 2 includes values 314, and byte 3 includes a header error check 318. Information 310, 314, and 318, however, may be located in any suitable bytes.

In the illustrated example, P/N information 310 may be given as follows:

| | |
|---|---|
| 10 | positive |
| 01 | negative |
| 11 | no justification |
| 00 | no justification |

In the illustrated example, values 314 may be given as follows:

| | |
|---|---|
| 000 | no justification |
| 001 | 1 byte justification |
| 010 | 2 byte justification |
| 011 | 3 byte justification |
| 100 | 4 byte justification |
| 101 | 5 byte justification |
| 110 | 6 byte justification |
| 111 | 7 byte justification |

In the illustrated example, header error check 318 may be the CRC calculated over bytes 1 and 2. In certain examples, header error check 318 may be an 8-bit CRC polynomial $x^8+x^2+x+1$.

In the illustrated example, bytes 0 and 1 for no justification are "0000 0000"; bytes 0 and 1 for positive justification are "101010xx" "xxxx xxxx"; bytes 0 and 1 for negative justification are "010101xx" "xxxx xxxx"; bytes 0 and 1 for positive justification of 1 byte are "010101x0" "0100 1001"; and bytes 0 and 1 for negative justification of 1 byte are "101010x0" "0100 1001".

Figure 4:
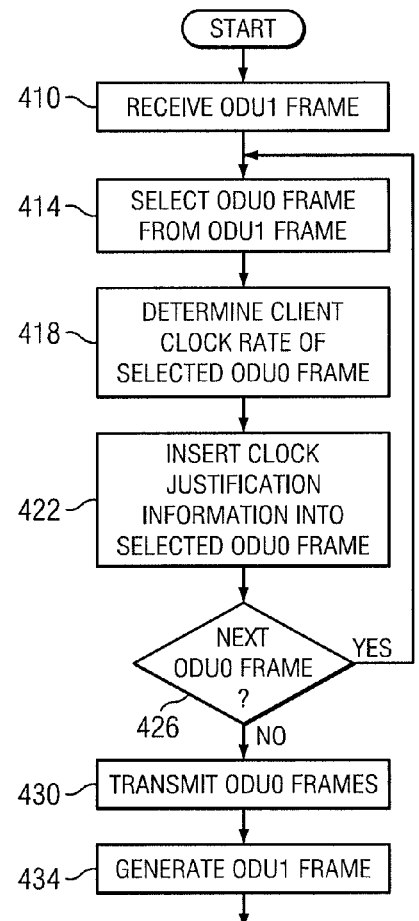
FIG. 4 illustrates an example of a method for transporting ODUs that may be performed by the system of FIG. 1.

FIG. 4 illustrates an example of a method for transporting ODUs that may be performed by system 10 of FIG. 1. The method starts at step 410, where a demux 24 receives an ODU1 that comprises ODU0s. Each ODU0 is associated with a signal having a client clock rate, at least two ODU0s are associated with at least two signals with different client clock rates.

In certain embodiments, demux 24 selects an ODU0 from the ODU1 at step 414. Demux 24 determines the client clock rate of signal of the selected ODU0 at step 418 and inserts clock justification information into the selected ODU0 at step 422. The clock justification information indicates how to justify the client clock rate of the ODU0 to synchronize the client clock rate with a system reference clock rate of a device, such as switch like packet fabric 32. In certain embodiments, the clock justification information comprises positive/negative information that indicates whether the justification is positive or negative, a value that indicates the amount of the justification, and a header error check calculated from a cyclic redundancy check over the positive/negative information and the value.

In certain embodiments, there may be a next ODU0 of the ODU1 at step 426. If there is, the method returns to step 414 to select the next ODU0. If not, the method proceeds to step 430. Demux 24 transmits the ODU0s to the switch at step 430. The switch configured to generate an ODU1 from the ODU0s at step 434. The method then ends.

A component of the systems and apparatuses disclosed herein may include an interface, logic, memory, and/or other suitable element. An interface receives input, sends output, processes the input and/or output, and/or performs other suitable operation. An interface may comprise hardware and/or software.

Logic performs the operations of the component, for example, executes instructions to generate output from input. Logic may include hardware, software, and/or other logic. Logic may be encoded in one or more tangible media and may perform operations when executed by a computer. Certain logic, such as a processor, may manage the operation of a component. Examples of a processor include one or more computers, one or more microprocessors, one or more applications, and/or other logic.

In particular embodiments, the operations of the embodiments may be performed by one or more computer readable media encoded with a computer program, software, computer executable instructions, and/or instructions capable of being executed by a computer. In particular embodiments, the operations of the embodiments may be performed by one or more computer readable media storing, embodied with, and/or encoded with a computer program and/or having a stored and/or an encoded computer program.

A memory stores information. A memory may comprise one or more tangible, computer-readable, and/or computer-executable storage medium. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

The systems, apparatuses, and methods disclosed herein may utilize communication protocols and technologies to provide the communication sessions. Examples of communication protocols and technologies include those set by the Institute of Electrical and Electronics Engineers, Inc. (IEEE) 802.xx standards, the International Telecommunications Union (ITU-T) standards, the European Telecommunications Standards Institute (ETSI) standards, the Internet Engineering Task Force (IETF) standards, or other standards.

Modifications, additions, or omissions may be made to the systems, apparatuses, and methods disclosed herein without departing from the scope of the invention. The components of the systems may be integrated or separated. Moreover, the operations of the systems may be performed by more, fewer, or other components. Additionally, operations of the systems may be performed using any suitable logic comprising software, hardware, and/or other logic. The methods may include more, fewer, or other steps. Additionally, steps may be performed in any suitable order. As used in this document, "each" refers to each member of a set or each member of a subset of a set. A set may include zero, one, or more elements. A subset of a set may include zero, one, two or more, or all elements of the set.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A method comprising:
receiving a first frame of a first type, the first frame comprising a plurality of second frames of a second type, each second frame associated with a signal having a client clock rate, at least two second frames associated with at least two signals with different client clock rates; and
repeating the following for each second frame:
determining a client clock rate of the signal associated with the second frame; and
inserting clock justification information comprising a justification byte, a negative justification opportunity byte, and a positive justification opportunity byte into the second frame before operation bytes and maintenance bytes to preserve overhead and payload portions of the second frame, the clock justification information indicating how to justify the client clock rate of the second frame to synchronize the client clock rate with a system reference clock rate.

2. The method of claim 1:
the first frame of the first type being an ODU1 frame; and
each second frame of the second type being an ODU0 frame.

3. The method of claim 1, the clock justification information comprising positive/negative information indicating whether the justification is positive or negative, a positive justification transporting fewer bytes, a negative justification transporting more bytes.

4. The method of claim 1, the clock justification information comprising positive/negative information comprising a plurality of replicated positive/negative indicators.

5. The method of claim 1, the clock justification information comprising a value indicating the amount of the justification.

6. The method of claim 1, the clock justification information comprising a value indicating the number of bytes of the justification.

7. The method of claim 1, the clock justification information comprising a header error check calculated from a cyclic redundancy check over a subset of the clock justification information.

8. The method of claim 1, the clock justification information comprising a header error check calculated from a cyclic redundancy check over a subset of the clock justification information according to an 8-bit polynomial.

9. The method of claim 1, each second frame of the second type being an ODU0 frame that can encapsulate a single Gigabit Ethernet packet.

10. An apparatus comprising:
a memory configured to store computer executable instructions; and
one or more processors coupled to the memory, the processors configured, when executing the instructions, to:
receive a first frame of a first type, the first frame comprising a plurality of second frames of a second type, each second frame associated with a signal having a client clock rate, at least two second frames associated with at least two signals with different client clock rates;
repeat the following for each second frame:
determine a client clock rate of the signal associated with the second frame; and
insert clock justification information comprising a justification byte, a negative justification opportunity byte, and a positive justification opportunity byte into the second frame before operation bytes and maintenance bytes to preserve overhead and payload portions of the second frame, the clock justification information indicating how to justify the client clock rate of the second frame to synchronize the client clock rate with a system reference clock rate.

11. The apparatus of claim 10:
the first frame of the first type being an ODU1 frame; and
each second frame of the second type being an ODU0 frame.

12. The apparatus of claim 10, the clock justification information comprising positive/negative information indicating whether the justification is positive or negative, a positive justification transporting fewer bytes, a negative justification transporting more bytes.

13. The apparatus of claim 10, the clock justification information comprising positive/negative information comprising a plurality of replicated positive/negative indicators.

14. The apparatus of claim 10, the clock justification information comprising a value indicating the amount of the justification.

15. The apparatus of claim 10, the clock justification information comprising a value indicating the number of bytes of the justification.

16. The apparatus of claim 10, the clock justification information comprising a header error check calculated from a cyclic redundancy check over a subset of the clock justification information.

17. The apparatus of claim 10, the clock justification information comprising a header error check calculated from a cyclic redundancy check over a subset of the clock justification information according to an 8-bit polynomial.

18. The apparatus of claim 10, each second frame of the second type being an ODU0 frame that can encapsulate a single Gigabit Ethernet packet.

19. One or more non-transitory computer-readable storage media compromising instructions for execution by one or more processors, the one or more processors being operable when executing the instructions to:
   receive a first frame of a first type, the first frame comprising a plurality of second frames of a second type, each second frame associated with a signal having a client clock rate, at least two second frames associated with at least two signals with different client clock rates; and
   repeat the following for each second frame:
      determine a client clock rate of the signal associated with the second frame; and
      insert clock justification information comprising a justification byte, a negative justification opportunity byte, and a positive justification opportunity byte into the second frame before operation bytes and maintenance bytes to preserve overhead and payload portions of the second frame, the clock justification information indicating how to justify the client clock rate of the second frame to synchronize the client clock rate with a system reference clock rate.

20. The non-transitory computer-readable storage media of claim 19:
   the first frame of the first type being an ODU1 frame; and
   each second frame of the second type being an ODU0 frame.

21. The non-transitory computer-readable storage media of claim 19, the clock justification information comprising positive/negative information indicating whether the justification is positive or negative, a positive justification transporting fewer bytes, a negative justification transporting more bytes.

22. The non-transitory computer-readable storage media of claim 19, the clock justification information comprising a value indicating the amount of the justification.

23. The non-transitory computer-readable storage media of claim 19, each second frame of the second type being an ODU0 frame that can encapsulate a single Gigabit Ethernet packet.

* * * * *